US009218254B2

(12) United States Patent
Locasto et al.

(10) Patent No.: US 9,218,254 B2
(45) Date of Patent: *Dec. 22, 2015

(54) SYSTEMS, METHODS, AND MEDIA FOR RECOVERING AN APPLICATION FROM A FAULT OR ATTACK

(71) Applicant: The Trustees of Columbia University in the City of New York, New York, NY (US)

(72) Inventors: Michael E. Locasto, Springfield, VA (US); Angelos D. Keromytis, New York, NY (US); Angelos Stavrou, Springfield, VA (US); Gabriela F. Ciocarlie, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/575,640

(22) Filed: Dec. 18, 2014

(65) Prior Publication Data
US 2015/0261624 A1 Sep. 17, 2015

Related U.S. Application Data

(63) Continuation of application No. 12/523,989, filed as application No. PCT/US2008/052220 on Jan. 28, 2008, now Pat. No. 8,924,782.

(60) Provisional application No. 60/897,571, filed on Jan. 26, 2007.

(51) Int. Cl.
*G06F 11/00* (2006.01)
*G06F 11/14* (2006.01)
*G06F 11/36* (2006.01)

(52) U.S. Cl.
CPC ........ *G06F 11/1469* (2013.01); *G06F 11/1471* (2013.01); *G06F 11/3604* (2013.01); *G06F 11/3612* (2013.01); *G06F 2201/84* (2013.01)

(58) Field of Classification Search
CPC ... G06F 8/62; G06F 11/1469; G06F 11/1471; G06F 11/3604; G06F 11/3612; G06F 11/3644
See application file for complete search history.

(56) References Cited

U.S. PATENT DOCUMENTS

| 4,740,969 A | 4/1988 | Fremont |
| 5,421,003 A | 5/1995 | Escola et al. |

(Continued)

FOREIGN PATENT DOCUMENTS

| WO | WO2008091272 | 7/2008 |
| WO | WO2007092524 | 8/2008 |

OTHER PUBLICATIONS

Abadi, M., et al., "Control-Flow Integrity: Principles, Implementations, and Applications", In Proceedings of the 12th ACM Conference on Computer and Communications Security (CCS '05), Alexandria, VA, USA, Nov. 7-11, 2005, pp. 340-353.

(Continued)

*Primary Examiner* — Alford Kindred
*Assistant Examiner* — Joseph Kudirka
(74) *Attorney, Agent, or Firm* — Byrne Poh LLP (57) ABSTRACT

Systems, methods, and media for recovering an application from a fault or an attack are disclosed herein. In some embodiments, a method is provided for enabling a software application to recover from a fault condition. The method includes specifying constrained data items and assigning a set of repair procedures to the constrained data items. The method further includes detecting a fault condition on the constrained data items during execution of the software application, which triggers at least one repair procedure. The triggered repair procedures are executed and the execution of the software application is restored. In some embodiments, the restoring comprises providing memory rollback to a point of execution of the software application before the fault condition was detected.

18 Claims, 7 Drawing Sheets

```
// Symbolic value definitions                                  ,-300
      symval FAIL_WITH_ERRORX = 3780;
310 ← symval ADDRESSOF_CANSAY = 0xbf87a3d4;
      symval TOP = 0;

// Constrained data item definition
320 → cdi cansayhello => mem[ADDRESSOF_CANSAY];

// Integrity verification procedure
330 → ivp MeasureHello :=:
              (cansayhello == true);
335 → ivp MeasureStack :=:
              ('raddress == 'shadowstack[TOP]);

// Repair procedure definition
340 → rp FixHello :=:
              ('rvalue == FAIL_WITH_ERRORX);

// Transformation procedure definition
350 → tp hello &MeasureStack, &MeasureHello :=:
              (rollback),
              &FixHello;
```

(56) References Cited

U.S. PATENT DOCUMENTS

| | | | |
|---|---|---|---|
| 5,568,380 | A | 10/1996 | Brodnax et al. |
| 5,581,697 | A | 12/1996 | Gramlich et al. |
| 5,712,971 | A | 1/1998 | Stanfill et al. |
| 5,948,112 | A | 9/1999 | Shimada et al. |
| 6,567,937 | B1 | 5/2003 | Flores et al. |
| 6,874,138 | B1 | 3/2005 | Ziegler et al. |
| 6,983,362 | B1 | 1/2006 | Kidder et al. |
| 6,993,760 | B2 | 1/2006 | Peev et al. |
| 7,114,150 | B2 | 9/2006 | Dimpsey et al. |
| 7,305,582 | B1 | 12/2007 | Moser et al. |
| 7,308,607 | B2 | 12/2007 | Reinhardt et al. |
| 7,607,041 | B2 | 10/2009 | Kraemer et al. |
| 7,640,587 | B2 * | 12/2009 | Fox et al. .................. 726/24 |
| 7,962,798 | B2 * | 6/2011 | Locasto et al. ............ 714/38.1 |
| 8,095,826 | B1 | 1/2012 | Deolasee |
| 2004/0034814 | A1 | 2/2004 | Thompson |
| 2004/0078562 | A1 | 4/2004 | Koning et al. |
| 2005/0034014 | A1 | 2/2005 | Moser et al. |
| 2005/0050386 | A1 | 3/2005 | Reinhardt et al. |
| 2005/0055606 | A1 | 3/2005 | Kutan et al. |
| 2005/0114731 | A1 | 5/2005 | Lomet et al. |
| 2006/0075306 | A1 | 4/2006 | Chandrasekaran |
| 2006/0085679 | A1 | 4/2006 | Neary et al. |
| 2006/0277433 | A1 | 12/2006 | Largman et al. |
| 2006/0294435 | A1 | 12/2006 | Vick et al. |
| 2007/0101192 | A1 | 5/2007 | Kutan et al. |
| 2007/0169030 | A1 | 7/2007 | Tarditi et al. |
| 2007/0283499 | A1 | 12/2007 | Chen et al. |
| 2008/0091272 | A1 | 4/2008 | Aram et al. |
| 2008/0133975 | A1 | 6/2008 | Pfeiffer et al. |
| 2009/0327806 | A1 | 12/2009 | Majumdar et al. |
| 2010/0023810 | A1 | 1/2010 | Stolfo et al. |
| 2010/0050176 | A1 | 2/2010 | Vanderpool |
| 2010/0058108 | A1 | 3/2010 | Nammatsu et al. |

OTHER PUBLICATIONS

Anagnostakis, K.G., et al., "Detecting Targeted Attacks Using Shadow Honeypots", In Proceedings of the 14th USENIX Security Symposium (SSYM '05), Baltimore, MD, USA, Jul. 31-Aug. 5, 2005, pp. 129-144.

Avijit, K., et al., "TIED, LibsafePlus: Tools for Runtime Buffer Overflow Protection", In Proceedings of the 13th USENIX Security Symposium, San Diego, CA, USA, Aug. 9-13, 2004, pp. 45-56.

Baratloo, A., et al., "Transparent Run-Time Defense Against Stack Smashing Attacks", In Proceedings of the 2000 USENIX Annual Technical Conference (ATEC '00), San Diego, CA, USA, Jun. 18-23, 2000, pp. 251-262.

Barrantes, E.G., et al., "Randomized Instruction Set Emulation to Disrupt Binary Code Injection Attacks", In Proceedings of the 10th ACM Conference on Computer and Communications Security Conference (CCS '03), Washington, DC, USA, Oct. 27-31, 2003, pp. 281-289.

Bhatkar, A., et al., "Dataflow Anomaly Detection", In Proceedings of the IEEE Symposium on Security and Privacy (S&P '06), Berkeley, CA, USA, May 21-24, 2006, pp. 48-62.

Bhatkar, S., et al., "Address Obfuscation: An Efficient Approach to Combat a Broad Range of Memory Error Exploits", In Proceedings of the 12th USENIX Security Symposium (SSYM '03), Washington, DC, USA, Aug. 4-8, 2003, pp. 105-120.

Brown, A.B., and Patterson, D.A., "Rewind, Repair, Replay: Three R's to Dependability", In Proceedings of the 10th ACM SIGOPS European Workshop, Saint-Emilion, FR, Jul. 1, 2002, pp. 70-77.

Buck, B. and Hollingsworth, J.K., "An API for Runtime Code Patching", In International Journal of High Performance Computing Applications, vol. 14, No. 4, Nov. 2000, pp. 317-329.

Cadar, C. and Engler, D.R., "Execution Generated Test Cases: How to Make Systems Code Crash Itself", In Proceedings of the 12th International SPIN Workshop (SPIN '05), San Francisco, CA, USA, Aug. 22-24, 2005, pp. 2-23.

Candea, G. And Fox, A., "Crash-Only Software", In Proceedings of the 9th Workshop on Hot Topics in Operating Systems (HotOS-IX), Lihue (Kauai), HI, USA, May 18-21, 2003, pp. 67-72.

Chari, S.N. and Cheng, P.C., "BlueBoX: A Policy-driven, Host-Based Intrusion Detection System", In Proceedings of the 9th Symposium on Network and Distributed Systems Security (NDSS '02), San Diego, CA, USA, Feb. 6-8, 2002, pp. 1-13.

Chen, S., et al., "Non-Control Data Attacks Are Realistic Threats", In Proceedings of the 14th USENIX Security Symposium, Aug. 2005, pp. 177-191.

Clark, D.D. and Wilson, D.R., "A Comparison of Commercial and Military Computer Security Policies", In Proceedings of the IEEE Symposium on Security and Privacy (S&P '87), Oakland, CA, USA, Apr. 27-29, 1987, pp. 184-194.

Cordy, J.R., et al., "Source Transformation in Software Engineering Using the TXL Transformation System", In Journal of Information and Software Technology, vol. 44, No. 13, Oct. 1, 2002, pp. 827-837.

Costa, M., et al., "Vigilante: End-to-End Containment of Internet Worms", In Proceedings of the 20th ACM Symposium on Operating Systems Principles (SOSP '05), Brighton, GB, Oct. 23-26, 2005, pp. 133-147.

Cowan, C., et al., "FormatGuard: Automatic Protection From printf Format String Vulnerabilites", In Proceedings of the 10th USENIX Security Symposium (SSYM '01), Washington, DC, USA, Aug. 13-17, 2001, pp. 191-199.

Cowan, C., et al., "Stackguard: Automatic Adaptive Detection and Prevention of Buffer-Overflow Attacks", In Proceedings of the 7th USENIX Security Symposium (SSYM '98), San Antonio, TX, USA, Jan. 26-29, 1998, pp. 63-78.

Crosby, S.A. and Wallach, D.S., "Denial of Service via Algorithmic Complexity Attacks", In Proceedings of the 12th USENIX Security Symposium (SSYM '03), Washington, DC, USA, Aug. 4-8, 2003, pp. 29-44.

Cui, W., et al., "ShieldGen: Automated Data Patch Generation for Unknown Vulnerabilities with Informed Probing", In Proceedings of the IEEE Symposium on Security and Privacy (S&P '07), May 20-23, 2007, pp. 252-266.

Demsky, B. and Rinard, M.C., "Automatic Data Structure Repair for Self-Healing Systems", In Proceedings of the First Workshop on Algorithms and Architectures for Self-Managing Systems, San Diego, CA, USA, Jun. 2003, pp. 1-6.

Demsky, B. and Rinard, M.C., "Automatic Detection and Repair of Errors in Data Structures", In Proceedings of the 18th Annual ACM SIGPLAN Conference on Object Oriented Programming, Systems, Languages, and Applications (OOPSLA '03), Anaheim, CA, USA, Oct. 26-30, 2003, pp. 78-95.

Eskin, E., et al., "Modeling System Calls for Intrusion Detection with Dynamic Window Sizes", In Proceedings of DARPA Information Survivability Conference and Exposition II (DISCEX II), Jun. 2001, pp. 1-11.

Etoh, J., "GCC Extension for Protecting Applications From Stack-Smashing Attacks", Technical Report, IBM Research, Aug. 22, 2005, pp. 1-3, available at: http://www.trl.ibm.com/projects/security/ssp.

Feng, H.H., et al., "Anomaly Detection Using Call Stack Information", In Proceedings of the IEEE Symposium on Security and Privacy (S&P '03), Oakland, CA, USA, May 11-14, 2003, pp. 62-77.

Gao, D., et al., "Behavioral Distance for Intrusion Detection", In Proceedings of the 8th International Symposium on Recent Advances in Intrusion Detection (RAID), Sep. 2005, pp. 63-81.

Gao, D., et al., "Gray-Box Extraction of Execution Graphs for Anomaly Detection", In Proceedings of the 11th ACM Conference on Computer and Communications Security (CCS '04), Washington, DC, USA, Oct. 25-29, 2004, pp. 318-329.

Giffin, J.T., et al., "Environment-Sensitive Intrusion Detection", In Proceedings of the 8th International Symposium on Recent Advances in Intrusion Detection (RAID '05), Seattle, WA, USA, Sep. 7-9, 2005, pp. 185-206.

Godefroid, P., et al., "Dart: Directed Automated Random Testing", In Proceedings of the ACM SIGPLAN 2005 Conference on Programming Language Design and Implementation (PLDI '05), Chicago, IL, USA, Jun. 12-15, 2005, pp. 213-223.

(56) References Cited

OTHER PUBLICATIONS

Handley, M., et al., "Network Intrusion Detection: Evasion, Traffic Normalization, and End-to-End Protocol Semantics", In Proceedings of the USENIX Security Conference, Washington D.C., USA, Aug. 13-17, 2001, pp. 1-31.
Hofmeyr, S.A., et. al., "Intrusion Detection System Using Sequences of System Calls", In Journal of Computer Security, vol. 6, No. 3, Aug. 18, 1998, pp. 151-180.
International Preliminary Report on Patentability dated Jul. 17, 2008 in International Application No. PCT/US2008/052220.
International Search Report and Written Opinion of the International Searching Authority, dated Jul. 14, 2008 in International Patent Application No. PCT/US2007/012784.
International Search Report dated Jul. 17, 2008 in International Patent Application No. PCT/US2008/052220.
Kc, G.S., et al., "Countering Code-Injection Attacks With Instruction-Set Randomization", In Proceedings of the ACM Computer and Communications Security (CCS '03) Conference, Washington, DC, USA, Oct. 27-30, 2003, pp. 272-280.
Kiriansky, V., et al., "Secure Execution Via Program Shepherding", In Proceedings of the 11th USENIX Security Symposium (SSYM '02), San Francisco, CA, USA, Aug. 5-9, 2002, pp. 191-205.
Lam, L.C. and Chiueh, T.C., "Automatic Extraction of Accurate Application-Specific Sandboxing Policy", In Proceedings of the 7th International Symposium on Recent Advances in Intrusion Detection (RAID '04), Sophia Antipolis, FR, Sep. 15-17, 2004, pp. 1-20.
Liang, Z. and Sekar, R., "Fast and Automated Generation of Attack Signatures: A Basis for Building Self-Protecting Servers", In Proceedings of the 12th ACM Conference on Computer and Communications Security (CCS '05), Alexandria, VA, USA, Nov. 7-11, 2005, pp. 213-222.
Locasto, M.E., "Binary Level Function Profiling for Intrusion Detection and Smart Error Virtualization", Technical Report CUCS-002-07, Columbia University, (month unknown) 2006, pp. 1-7.
Locasto, M.E., et al., "A Model for Automatically Repairing Execution Integrity", Technical Report, Columbia University, (month unknown) 2007, pp. 1-17.
Locasto, M.E., et al., "FLIPS: Hybrid Adaptive Intrusion Prevention", In Proceedings of the 8th International Symposium on Recent Advances in Intrusion Detection (RAID '05), Seattle, WA, USA, Sep. 7-9, 2005, pp. 82-101.
Locasto, M.E., et al., "Quantifying Application Behavior Space for Detection and Self-Healing", Technical Report CUCS-017-06, Columbia University, (month unknown) 2006, pp. 1-19.
Locasto, M.E., et al., "Software Self-Healing Using Collaborative Application Communities", In Proceedings of the Network and Distributed System Security Symposium (NDSS '06), San Diego, CA, USA, Feb. 1-3, 2006, pp. 1-13.
Luk, C., et al., "Pin: Building Customized Program Analysis Tools with Dynamic Instrumentation", In Proceedings of the ACM SIGPLAN 2005 Conference on Programming Language Design and Implementation (PLDI '05), Chicago, IL, USA, Jun. 12-15, 2005, pp. 190-200.
Miller, B., et al., "Fuzz Revisited: A Re-Examination of the Reliability of UNIX Utilities and Services", Technical Report, University of Wisconsin, Oct. 1995, pp. 1-23.
Mosberger, D. And Jin, T., "httperf—A Tool for Measuring Web Server Performance", In ACM Sigmetrics Performance Evaluation Review, vol. 26, No. 3, Dec. 1998, pp. 31-37.
Necula, G.C., et al., "CCured: Type-Safe Retrofitting of Legacy Code", In Proceedings of the Principles of Programming Language (PoPL '02), Portland, OR, USA, Jan. 16-18, 2002, pp. 128-139.
Nethercote, N., and Seward, J., "Valgrind: A Program Supervision Framework", In Electronic Notes in Theoretical Computer Science, vol. 89, No. 2, Oct. 2003, pp. 44-66.
Newsome, J., "Vulnerability-Specific Execution Filtering for Exploit Prevention on Commodity Software", In Proceedings of the 13th Symposium on Network and Distributed System Security (NDSS '06), San Diego, CA, USA, Feb. 1-3, 2006, pp. 1-14.

Newsome, J., and Song, D., "Dynamic Taint Analysis for Automatic Detection, Analysis, and Signature Generation of Exploits on Commodity Software", In Proceedings of the 12th Annual Network and Distributed System Security Symposium (NDSS '05), Feb. 2005, pp. 1-17.
Notice of Allowance dated May 21, 2014 in U.S. Appl. No. 12/523,989.
Office Action dated Jan. 18, 2013 in U.S. Appl. No. 12/523,989.
Office Action dated Apr. 13, 2010 in U.S. Appl. No. 11/785,317.
Office Action dated May 9, 2012 in U.S. Appl. No. 12/523,989.
Office Action dated Sep. 3, 2013 in U.S. Appl. No. 12/523,989.
Office Action dated Oct. 12, 2011 in U.S. Appl. No. 12/523,989.
Oplinger, J. and Lam, M.S., "Enhancing Software Reliability with Speculative Threads", In Proceedings of the 10th International Conference on Architectural Support for Programming Languages and Operating Systems (ASPLOS-X '02), San Jose, CA, USA, Oct. 5-9, 2002, pp. 184-196.
Osman, S., et al., "The Design and Implementation of ZAP: A System for Migrating Computing Environments", In Proceedings of the 5th Symposium on Operating Systems Design and Implementation (OSDI '02), Boston, MA, USA, Dec. 9-11, 2002, pp. 361-376.
Provos, N., "Improving Host Security with System Call Policies", In Proceedings of the 12th USENIX Security Symposium (SSYM '03), Washington, DC, USA, Aug. 4-8, 2003, pp. 257-272.
Qin, F., et al., "Rx: Treating Bugs as Allergies—A Safe Method to Survive Software Failures", In Proceedings of the 20th ACM Symposium on Operating Systems Principles (SOSP '05), Brighton, UK, Oct. 23-26, 2005, pp. 235-248.
Rinard, M., "Acceptability-Orientented Computing", In Proceedings of the 18th Annual ACM SIGPLAN Conference on Object Oriented Programming, Systems, Languages, and Application (OOPSLA), Oct. 2003, pp. 1-19.
Rinard, M., et al. "Enhancing Server Availability and Security Through Failure-Oblivious Computing", In Proceedings 6th Symposium on Operating Systems Design and Implementation (OSDI '04), San Francisco, CA, USA, Dec. 6-8, 2004, pp. 303-316.
Rinard, M., et al., "A Dynamic Technique for Eliminating Buffer Overflow Vulnerabilities (and Other Memory Errors)", In Proceedings 20th Annual Computer Security Applications Conference (ACSAC '04), Tucson, AZ, USA, Dec. 6-10, 2004, pp. 82-90.
Rudys, A. and Wallach, D.S., "Termination in Language-Based Systems", In ACM Transactions on Information and System Security (TISSEC '02), vol. 5, No. 2, May 2002, pp. 138-168.
Sengupta, R., et al., "Software Fault Tolerance for Low to Moderate Radiation Environments", In Proceedings of the Conference on Astronomical Data Analysis Software and Systems X, vol. 238, Boston, MA, USA, Nov. 12-15, 2001, pp. 257-260.
Shankar, U., et al., "Detecting Format String Vulnerabilites with Type Qualifiers", In Proceedings of the 10th USENIX Security Symposium (SSYM '01), Washington, DC, USA, Aug. 13-17, 2001, pp. 201-216.
Sidiroglou, S. and Keromytis, A.D., "A Network Worm Vaccine Architecture", In Proceedings of the Twelfth IEEE International Workshops on Enabling Technologies: Infrastructure for Collaborative Enterprises (WETICE '03), Workshop on Enterprise Security, Linz, AT, Jun. 9-11, 2003, pp. 220-225.
Sidiroglou, S., et al., "A Dynamic Mechanism for Recovering from Buffer Overflow Attacks", In Proceedings of the 8th Information Security Conference (ISC '05), Singapore, SG, Sep. 20-23, 2005, pp. 1-15.
Sidiroglou, S., et al., "ASSURE: Automatic Software Self-Healing using Rescue Points", In Proceedings of the 14th International Conference on Architectural Support for Programming Languages and Operating Systems (ASPLOS XIV '09), Washington, DC, USA, Mar. 7-11, 2009, pp. 37-48.
Sidiroglou, S., et al., "Building a Reactive Immune System for Software Services", In Proceedings of the 2005 USENIX Annual Technical Conference (USENIX '05), Anaheim, CA, USA, Apr. 10-15, 2005, pp. 149-161.
Smirnov, A. and Chiueh, T., "DIRA: Automatic Detection, Identification, and Repair of Control-Hijacking Attacks", In Proceedings of the 12th Symposium on Network and Distributed System Security (NDSS '05), San Diego, CA, USA, Feb. 3-4, 2005, pp. 1-17.

(56) References Cited

OTHER PUBLICATIONS

Somayaji, A. and Forrest, S., "Automated Response Using System-Call Delays", In Proceedings of the 9th Conference on USENIX Security Symposium (SSYM '00), Denver, CO, USA, Aug. 14-17, 2000, pp. 1-13.

Somayaji, A.B., "Operating System Stability and Security through Process Homeostasis", Ph.D Dissertation, University of New Mexico, Jul. 2002, pp. 1-198.

Srivastava, A. and Eustace, A., "Atom—A System for Building Customized Program Analysis Tools", In Proceedings of the ACM SIGPLAN 1994 Conference on Programming Language Design and Implementation (PLDI '94), Orlando, FL, USA, Jun. 20-24, 1994, pp. 196-205.

Stolfo, S.J., et al., "A Comparative Evaluation of Two Algorithms for Windows Registry Anomaly Detection", In Journal of Computer Security, vol. 13, No. 4, Oct. 2005, pp. 659-693.

Stolfo, S.J., et al., "Anomaly Detection in Computer Security and an Application to File System Accesses", In Proceedings of the 15th International Syposium on Methodologies for Intelligent Systems (ISMIS '05), Saratoga Springs, NY, USA, May 25-28, 2005, pp. 14-28.

Suh, G.E., et al., "Secure Program Execution via Dynamic Information Flow Tracking", In Proceedings of the 11th International Conference on Architectural Support for Programming Languages and Operating Systems (ASPLOS '04) Boston, MA, USA, Oct. 7-13, 2004, pp. 85-96.

U.S. Appl. No. 11/785,317, filed Apr. 17, 2007.

U.S. Appl. No. 60/792,430, filed Apr. 17, 2006.

Wagner, D. and Soto, P., "Mimicry Attacks on Host-Based Intrusion Detection Systems", In Proceedings of the Ninth ACM Conference on Computer and Communications Security (CCS '02), Washington, DC, USA, Nov. 18-22, 2002, pp. 255-264.

Wang, H.J., et al. "Shield: Vulnerability-Driven Network Filters for Preventing Known Vulnerability Exploits", In Proceedings of the 2004 Conference on Applications, Technologies, Architectures, and Protocols for Computer Communications (SIGCOMM '04), Portland, OR, USA, Aug. 30-Sep. 3, 2004, pp. 193-204.

Wang, N.J., et at., "Y-Branches: When You Come to a Fork in the Road, Take It", In Proceedings of the 12th International Conference on Parallel Architectures and Compilation Techniques (PACT '03), New Orleans, LA, USA, Sep. 27-Oct. 1, 2003, pp. 56-66.

Written Opinion dated Jul. 17, 2008 in International Patent Application No. PCT/US2008/052220.

Xu, J., et al., "Automatic Diagnosis and Response to Memory Corruption Vulnerabilities", In Proceedings of the 12th ACM Conference on Computer and Communications Security (CCS '05), Alexandria, VA, USA, Nov. 7-11, 2005, pp. 223-234.

Zhou, F., et al., "SafeDrive: Safe and Recoverable Extensions Using Language-Based Techniques", In Proceeding of the 7th Symposium on Operating Systems Design and Implementation (OSDI '06), Seattle, WA, USA, Nov. 6-8, 2006, pp. 45-60.

\* cited by examiner

Fig. 1

```
// Symbolic value definition
symval AUTHENTICATION_FAILURE = 0;          ← 210

// Integrity verification procedure
ivp MeasureStack :=:                         ← 220
    ('raddress=='shadowstack[0]);            ← 221

// Repair procedure definition
rp FixAuth :=:                               ← 230
    ('rvalue==AUTHENTICATION_FAILURE),       ← 231
    (rollback);                              ← 232

// Transformation procedure definition
tp check_credentials &MeasureStack :=:       ← 240
    &FixAuth;
```

Fig. 2

```
// Symbolic value definitions
   symval FAIL_WITH_ERRORX = 3780;
310 symval ADDRESSOF_CANSAY = 0xbf87a3d4;
   symval TOP = 0;

// Constrained data item definition
320 cdi cansayhello => mem[ADDRESSOF_CANSAY];

// Integrity verification procedure
330 ivp MeasureHello :=:
         (cansayhello == true);
335 ivp MeasureStack :=:
         ('raddress == 'shadowstack[TOP]);

// Repair procedure definition
340 rp FixHello :=:
         ('rvalue == FAIL_WITH_ERRORX);

// Transformation procedure definition
350 tp hello &MeasureStack, &MeasureHello :=:
         (rollback),
         &FixHello;
```

```
// Function "bar"
int bar(char* buf)
{
    char rbuf[10];
    int i=0;

// Mapping to anticipated error      520
    if(NULL==buf)
        return -1;

while(i<strlen(buf))
    {
// Buffer overflow vulnerability
        rbuf[i++]=*buf++;              510
    }
// Normal return
    return 0;                          530
}
```

```
int login(UCRED creds)                    611
{
    int authenticated = check_credentials(creds);
    if(authenticated)
        return login_continue();
    else
        return login_reject();        614
} int check_credentials(UCRED credentials)
{
    strcpy(uname, credentials.username);
    return checkpassword(lookup(uname), credentials);
}
```

SYSTEMS, METHODS, AND MEDIA FOR RECOVERING AN APPLICATION FROM A FAULT OR ATTACK

CROSS-REFERENCE TO RELATED APPLICATION

This application is a continuation of U.S. patent application Ser. No. 12/523,989, filed May 5, 2010, which is the United States National Phase Application under 35 U.S.C. §371 of International Application No. PCT/US2008/052220, filed Jan. 28, 2008, which claims the benefit of U.S. Provisional Patent Application No. 60/897,571, filed Jan. 26, 2007. Each of the above-referenced patent applications is hereby incorporated by reference herein in its entirety.

STATEMENT REGARDING FEDERALLY SPONSORED RESEARCH OR DEVELOPMENT

This invention was made with government support under Agreement Number FA8750-06-2-0221 awarded by the Air Force Research Laboratory. The government has certain rights in the invention.

BACKGROUND

1. Field

The present application relates generally to systems, methods, and media for software automated remediation of faults and attacks.

2. Background Art

Software faults and vulnerabilities continue to present significant obstacles to achieving reliable and secure software. Most software applications lack the ability to repair themselves during an attack, especially when attacks are delivered through previously unseen inputs or exploit previously unknown vulnerabilities. Computer defense systems detect several types of malicious behavior that can compromise the security and trust of a computer system, and most commonly crash the process that they protect as part of their response to these attacks.

Self-healing software involves the creation of systems capable of automatic remediation of faults and attacks. In addition to detecting and defeating an attack, self-healing systems seek to correct the integrity of the computation itself. Self-healing counter-measures serve as a first line of defense, while a slower but potentially more complete human-driven response takes place. The workflow of most self-healing mechanisms involves recognizing a threat or an attack, orienting the system to the threat by analyzing it, adapting to the threat by constructing appropriate fixes or changes in the system state, and finally responding to the threat by verifying and deploying those adaptations.

Techniques that employ self-healing mechanisms face a few obstacles before they can be deployed to protect and repair legacy systems, production applications, and Commercial Off-The-Shelf (COTS) software. For example, an obstacle preventing this deployment is when the self-healing system makes changes to the application's source code. Moreover, another obstacle is presented when the semantics of program execution are not maintained close to the original intent of the application's author. Additionally, self-healing systems not compatible with applications that communicate with external entities beyond the control or logical boundary of the self-healing system cannot be widely deployed. Finally, it is important for systems to employ detection mechanisms that can indicate when to supervise and heal the application's execution.

SUMMARY

Systems, Methods, and Media for recovering an application from a fault or an attack are disclosed herein.

In some embodiments, a method is provided for enabling a software application to recover from a fault condition. The method includes specifying constrained data items and assigning a set of repair procedures to the constrained data items. The method further includes detecting a fault condition on the constrained data items during execution of the software application, which triggers at least one repair procedure. The triggered repair procedure is executed and the execution of the software application is restored. In some embodiments, the restoring comprises providing memory rollback to a point of execution of the software application before the fault condition was detected.

In some embodiments, the software application receives input data from an external entity using a virtual input proxy and sends output data to an external entity using a virtual output proxy. The output data are buffered until input data are expected from the external entity.

In some embodiments the constrained data items are memory locations and the triggered repair procedure assigns specific values to the memory locations. In some embodiments the triggered repair procedure uses portions of the application's code and means are specified to indicate specific portions from the software application's code to be used by the triggered repair procedure and ways these specific portions to be used as part of the triggered repair procedure.

In some embodiments, the default condition comprises an incorrect function return value. In other embodiments, the default condition comprises an anomalous function call. In some embodiments detecting the fault condition comprises detecting, using a shadow stack, integrity violations of at least one of a return address and other stack frame information.

BRIEF DESCRIPTION OF THE DRAWINGS

The disclosed embodiments will be more readily understood from a detailed description of the preferred embodiments taken in conjunction with the following figures.

DETAILED DESCRIPTION

Embodiments of the disclosed subject matter describe systems, methods, and media to recover from faults and attacks in a manner that inhibits the attacked application from crashing, or otherwise falling under the control of an attacker. Therefore, applications can continue execution through a fault or attack.

Self-healing mechanisms complement approaches that stop attacks from succeeding by inhibiting the injection of code, transfer of control to injected code, or misuse of existing code. Approaches to automatically defending software systems have typically focused on ways to proactively protect an application from attacks. Examples of these proactive approaches include writing the system in a safe language, for example, Java, linking the system with safe libraries, transforming the program with artificial diversity, or compiling the program with stack integrity checking Some defense systems, also externalize their response by generating either vulnerability or exploit signatures to inhibit malicious input from reaching the protected system. These systems are described in the literature, for example, in Cui, W., Peinado, M., Wang, H. J., and Locasto, M. E. ShieldGen: Automated Data Patch Generation for Unknown Vulnerabilities with Informed Probing, In Proceedings of the IEEE Symposium on Security and Privacy (May 2007), and in Locasto, M. E., Wang, K., Keromytis, A. D., and Stolfo, S. J. FLIPS: Hybrid Adaptive Intrusion Prevention, in Proceedings of the 8th International Symposium on Recent Advances in Intrusion Detection (RAID) (September 2005), pp. 82-101.

"Program Shepherding" is described in Kiriansky, V., Bruening, D., and Amarasinghe, S. Secure Execution Via Program Shepherding, in Proceedings of the 11$^{th}$ USENIX Security Symposium (August 2002) and enforces the integrity of control flow, by validating branch instructions to inhibit transfer of control to injected code and making sure that calls directed to native libraries originate from valid sources. Control flow is often corrupted because input data are eventually incorporated into part of an instruction's operation code (opcode), set as a jump target, or form part of an argument to a sensitive system call. Another work focuses on ways to inhibit these attacks using tainted dataflow analysis.

High-level programming often assumes properties of control flow that are not enforced at the machine level. Based on this observation, researchers propose formalizing the concept of Control Flow Integrity (CFI) to provide a way to statically verify the execution proceeds within a given control-flow graph, which serves as a policy. CFI is described in detail in Abadi, M., Budiu, M., Erlingsson, U., and Ligatti, J. Control-Flow Integrity: Principles, Implementations, and Applications, in Proceedings of the ACM Conference on Computer and Communications Security (CCS) (2005). The use of CFI enables the efficient implementation of a software call stack with strong protection guarantees. CFI complements the disclosed subject matter in that it can enforce the invocation of selective transactional emulation, rather than allowing malicious code to skip past its invocation.

Most defense mechanisms usually respond to an attack by terminating the attacked process. This policy is considered "safe," however, this approach is unappealing because it leaves systems susceptible to the original fault upon restart and risks losing the accumulated state.

Initial efforts at providing effective remediation strategies include failure oblivious computing, error virtualization, rollback of memory updates, crash-only software, and data structure repair. The first two approaches can cause a semantically incorrect continuation of execution, although this difficulty can be addressed by exploring semantically safe alterations of the program's environment. "Hardware Thread-Level Speculation" can improve software reliability, where an application's monitoring code is executed in parallel with the primary computation and the computation "transaction" is rolled back depending on the results of the monitoring code. Another approach employs proxies that explicitly deal with protocol syntax and semantics during replay.

Another attempt to reduce the likelihood of a semantically incorrect response to a fault or attack proposes the notion of error virtualization rescue points. A rescue point is a program location that is known to successfully propagate errors and recover execution. The insight is that a program will respond to a malformed input differently than a legal input; locations in the code that successfully handle these sorts of anticipated input "faults" are good candidates for recovering to a safe execution flow. Essentially, this is a type of exception handling that dynamically identifies the best scope to handle an error.

Other self-healing efforts perform behavior-based anomaly detection, where mechanisms are provided to capture aspects of an application's behavior. This profiling can be employed, for example, to detect application misbehavior, to aid self-healing, to validate the self-healing response, and to ensure that the application does not deviate further from its known behavior. Aspects of both the control flow, through the execution context, and portions of the data flow, via function return values, can be captured and profiled.

The disclosed subject matter provides practical speculative execution for automated defense and builds on work on microspeculation, error virtualization, and selective transactional emulation.

The basic premise of microspeculation is that portions of an application can be treated as a transaction. For example, functions serve as a convenient abstraction and fit the transaction role well in most situations. A transaction can be treated as a vulnerable code slice and can be speculatively executed in a "sandbox" environment. In much the same way that a processor speculatively executes past a branch instruction and discards the mispredicted code path, the transaction's instruction stream is executed, optimistically "speculating" that the results of these computations are benign. If this microspeculation succeeds, then the computation simply carries on. If the transaction experiences a fault or exploited vulnerability, then the results are ignored or replaced according to the particular response strategy being employed. An example of such a strategy is "error virtualization."

The key assumption underlying error virtualization is that a mapping can be created between the set of errors that occur during a program's execution and the limited set of errors that the program code explicitly handles. By "virtualizing" errors, an application can continue execution through a fault or exploited vulnerability by nullifying its effects and using a manufactured return value for the function where the fault occurred. These return values can be determined by source code analysis on the return type of the offending function.

Figure 5:
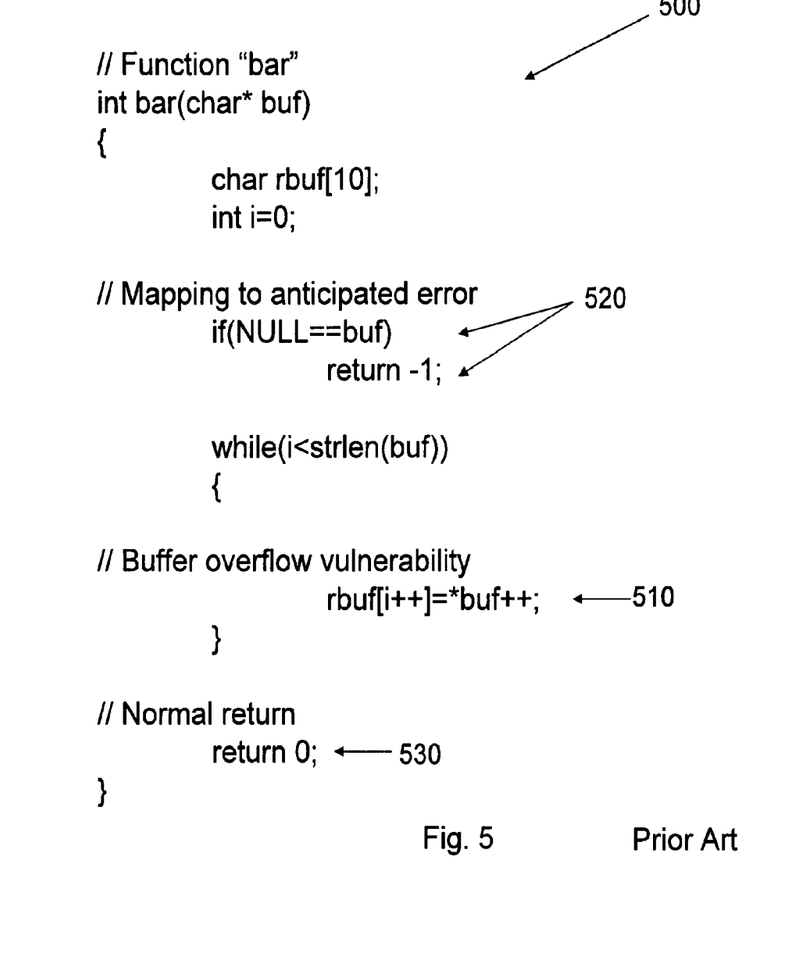
FIG. 5 shows an example of error virtualization.

FIG. 5 shows an example 500 of error virtualization. An unanticipated error, like an exploit of the buffer overflow vulnerability 510, is mapped to anticipated error conditions explicitly handled by the existing program code 520, specifically, with an error condition return value of "−1." A non-buffer overflow execution of the code returns a normal return value of "0" 530.

Error virtualization alone is not appropriate for the functions and applications, where the function is not idempotent or where the application makes scientific or financial calculations or includes authentication and authorization checks. A repair policy provides a more complete approach to managing the semantic correctness of a repair.

Achieving a semantically correct response remains a key problem for self-healing systems. Executing through a fault or attack involves a certain amount of risk. Even if the application somehow ignores the attack itself, the best sequence of actions leading back to a safe state is an open question. Possibly, the exploit has caused a number of changes in the state that can corrupt execution integrity before an alert is issued. Attempts to self-heal are expected to not only stop an exploit from succeeding or a fault from manifesting, but also to repair the execution integrity as much as possible. However, self-healing strategies that execute through a fault by effectively pretending it can be handled by the program code or other instrumentation can give rise to semantically incorrect responses. In effect, naive self-healing can provide a cure worse than the disease.

Plain error virtualization seems to work best with server applications, which are applications that typically have a request processing loop that can presumably tolerate minor errors in a particular trace of the loop. The disclosed subject matter, however, aims to provide a practical solution for client applications, for example, email, messaging, authoring, and browsing applications, as well as servers.

Selective transactional emulation at the instruction level, allows the execution of emulated and non-emulated source code inside the same process. Monitoring a specific type of failure prior to executing an instruction can allow, for example, undoing memory changes made by the function inside which the fault occurred. The instruction-level emulator performs that "undoing" by recording memory modifications made during its execution and simulating an error-return from the specific function.

The recovery mechanism uses an instruction-level emulator, that can be selectively invoked for arbitrary segments of code, permitting the execution of emulated and non-emulated code inside the same process. The emulator can be either linked with an application in advance or be compiled in the code in response to a detected failure. Upon entering the vulnerable section of code, the emulator creates a snapshot of the program state and executes the instructions on a virtual processor. When the program counter references the first instruction outside the bounds of emulation, the virtual processor copies its internal state back to the real CPU, and lets the program continue execution natively. While registers are explicitly updated, memory updates have implicitly been applied throughout the execution of the emulation. The program, unaware of the instructions executed by the emulator, continues executing directly on the CPU.

Approaches to self-healing, such as error virtualization and failure-oblivious computing, inhibit exploits from succeeding by masking failures. However, error virtualization fails about 12% of the time, and both approaches have the potential for semantically incorrect execution. These shortcomings are devastating for applications that perform precise calculations or provide authentication and authorization, such as financial or scientific applications.

Furthermore, error virtualization expects access to the source code of the application to determine appropriate error virtualization values and proper placement of the calls to the supervision environment. A better solution would operate on unmodified binaries and profile the application's behavior to learn appropriate error virtualization values during runtime.

As with systems that rely on rewinding execution after a fault has been detected, I/O with external entities remains uncontrolled. For example, if a server program writes a message to a network client during microspeculation, there is no way to "take back" the message, because the state of the remote client has been irrevocably altered.

The disclosed subject matter provides the basis for a Selective Transactional Emulator's (STEM) core mechanisms as well as methods to guide the semantic correctness of the self-healing response.

According to a preferred embodiment of the disclosed subject matter, the need for source-level modifications is eliminated, by the use of error virtualization and microspeculation during binary re-writing. As a result, STEM serves as a self-contained environment for supervising applications without recompiling or changing the source code. Therefore, STEM can protect COTS software and is applicable in situations where the source code of the application is not available.

The semantic correctness of the healing process can be affected when microspeculation needs to rewind the results of communication with remote entities that are not under the control of the self-healing system. According to an embodiment of the disclosed subject matter, virtual proxies are employed to support cooperative microspeculation without changing the communications protocols or the code of the remote entity.

STEM can be built as a tool for a binary rewriting framework. According to an embodiment of the disclosed subject matter, STEM is built as a tool for the IA-32 binary rewriting PIN framework. PIN is described in Luk, C.-K., Cohn, R., Muth, R., Patil, H., Klauser, A., Lowney, G., Wallace, S., Reddi, V. J., and Hazelwood, K. Pin: Building Customized Program Analysis Tools with Dynamic Instrumentation, in Proceedings of Programming Language Design and Implementation (PLDI) (June 2005). In other embodiments of the disclosed subject matter, STEM can be implemented through binary emulation. In other embodiments of the disclosed subject matter, STEM can be implemented using virtual machine monitors, for example, "VMWare" and "Parallels." In other embodiments of the disclosed subject matter, STEM can be implemented by rewriting source-code.

PIN provides an Application Programming Interface (API) that exposes a number of methods to instrument a program during runtime, both statically, as a binary image is loaded, and dynamically, as an instruction, a basic block, or a procedure is executed. PIN tools contain two basic types of functions: instrumentation functions and analysis functions. When a PIN tool starts up, it registers instrumentation functions that serve as callbacks for when PIN recognizes an event or portion of program execution in which the tool is interested, for example, an instruction execution or a basic block entrance or exit. The instrumentation functions then employ the PIN API to insert calls to their analysis functions. Analysis functions are invoked when the corresponding code slice is executed; instrumentation functions are executed only the first time that PIN encounters the code slice.

STEM treats a function as a transaction. A transaction that is supervised, according to a policy discussed below, is speculatively executed. STEM uses PIN to instrument program execution at four points:

Function entry, i.e., immediately before a CALL instruction.

Function exit, i.e., between a LEAVE and RETURN instruction.

Immediately before the instruction after a RETURN instruction executes.

For an instruction of a supervised function that writes to memory.

STEM inserts instrumentation at both the start and end of a transaction to save the state and check for errors, respectively. If microspeculation of the transaction encounters errors, for example, an attack or other fault, then the instrumentation at the end of the transaction invokes cleanup, repair, and repair validation mechanisms.

According to an embodiment of the disclosed subject matter, STEM uses the "Routine" hooks provided by PIN. When PIN encounters a function that it has not yet instrumented, it invokes the callback instrumentation function that STEM had registered. The instrumentation function injects calls to four analysis routines:

STEM_Preamble( )—executed at the beginning of a function.
STEM_Epilogue( )—executed before a RETURN instruction.
SuperviseInstruction( )—executed immediately after a RETURN instruction.
RecordPreMemWrite( )—executed before an instruction of a supervised function that writes to memory.

STEM's instrumentation function also intercepts some system calls to support the Code Security Analysis Kit (CoSAK) supervision policy and the virtual proxies, which are discussed further below.

One important implementation tradeoff is whether the decision to supervise a function is made at injection time (i.e. during the instrumentation function) or at analysis time (i.e., during an analysis routine). Consulting policy and making a decision in the latter allows STEM to change the coverage supervision policy, the set of functions that STEM monitors, during runtime rather than needing to restart the application. Making the decision during injection time is possible, but only for a subset of the routines, and since the policy decision is made only once, the set of functions that STEM can instrument is not dynamically adjustable unless the application is restarted, or PIN removes the instrumentation and invokes instrumentation for the functions again.

Therefore, the injected analysis routine determines dynamically if it is actually supervising the current function. STEM instructs PIN to instrument the functions. A STEM analysis routine gains control, even for just long enough to determine that it will not supervise a particular function. The analysis routines invoke STEM's ShouldSuperviseRoutine( ) function to check the current supervision coverage policy in effect. Supervision coverage policies and performance considerations dictate which subset of an application's functions STEM protects. For example, these policies can include:

NONE—no function is microspeculated, according to this embodiment.
ALL—all functions are microspeculated, according to this embodiment.
RANDOM—a random subset is microspeculated (the percentage is controlled by a configuration parameter), according to this embodiment.
CoSAK—the functions within a call stack depth of six from an input system call (e.g., sys_read( )) are microspeculated, according to this embodiment.
LIST—functions specified in a profile (either generated automatically by STEM or manually specified) are microspeculated, according to this embodiment.

STEM maintains a CoSAK_depth variable via four operations: check, reset, increment, and decrement to support the CoSAK coverage policy. When an input system call is encountered, the variable is reset to zero. The variable is checked during ShouldSuperviseRoutine( ), if the coverage policy is set to CoSAK. The variable is incremented when a new routine is entered during STEM_Preamble( ) and decremented during STEM_Epilogue( ).

Although STEM can supervise an application from startup, STEM benefits from using PIN because PIN can attach to a running application. For example, if a network sensor detects anomalous data aimed at a web server, STEM can attach to the web server process to protect it while that data is being processed. Therefore, applications can avoid the startup costs involved in instrumenting shared library loading, and can also avoid the overhead of the policy check for most normal input.

STEM starts by reading its configuration file, attaching some command and control functionality, and then registering a callback to instrument a new function that it encounters. STEM's basic algorithm is distributed over the four main analysis routines. STEM can also operate in profiling mode. In that case, these analysis routines remain unused.

Since STEM treats a function as a transaction, undoing the effects of a speculated transaction means keeping a log of changes made to memory during the transaction.

The memory log is maintained by three functions: one that records the "old" memory value, one that inserts a marker into the memory log, and one that rolls back the memory log and optionally restores the "old" values. STEM inserts a call to the RecordPreMemWrite( ) analysis routine before an instruction that writes to memory. PIN determines the size of the write, so this analysis function can save the appropriate amount of data. Memory writes are only recorded for functions that are supervised according to the coverage policy. During STEM_Preamble( ), PIN inserts a call to InsertMemLogMarker( ) to delimit a new function instance. This marker indicates that the last memory log maintenance function, UnrollMemoryLog( ), stops rolling back after it encounters the marker. The rollback function deletes the entries in the memory log to make efficient use of the process's memory space. This function can also restore the "old" values stored in the memory log in preparation for repair.

STEM_Preamble( ) performs basic record keeping. It increments the CoSAK_depth variable and maintains other statistics, for example, the number of routines supervised. Its most important tasks are to check if the supervision coverage policy will be reloaded and to insert a function name marker into the memory log if the current function will be supervised.

STEM invokes STEM_Epilogue( ) immediately before a return instruction. Besides maintaining the CoSAK_depth variable, this analysis routine ensures that the application has a chance to self-heal before a transaction is completed. If the current function is being supervised, this routine interprets the application's repair policy, invokes the repair procedure, and invokes the repair validation procedure. If both of these latter steps are successful or no repair is needed, then the transaction is considered to be successfully committed. If not, and an error has occurred, then STEM falls back to crashing the process by calling abort( ).

Additionally, STEM_Epilogue( ) delegates the setup of error virtualization to the repair procedure. The repair procedure takes the function name, the current architectural context, for example the CPU register values, and a flag as input. The flag serves as an indication to the repair procedure to choose between normal cleanup or a "self-healing" cleanup. While normal cleanup always proceeds from STEM_Epilogue( ), a self-healing cleanup can be invoked synchronously from the routine or asynchronously from a signal handler. The latter case usually occurs when STEM employs a detector that causes a signal such as the SIGSEGV signal to occur when it senses an attack. Normal cleanup simply entails deleting the entries for the current function from the memory log. If self-healing is needed, then the values from the memory log are restored. In addition, a flag is set indicating that the process will undergo error virtualization, and the current function name is recorded.

SuperviseInstruction( ) intercepts the instruction that immediately follows a RETURN instruction, allowing the RETURN instruction to operate as it needs to on the architectural state and by extension the process stack. After a RETURN instruction has been invoked, if the flag for error virtualization is set, then STEM looks up the appropriate error virtualization value according to the policy. STEM then performs error virtualization by adjusting the value of the % eax register and resets the error virtualization flag. STEM ensures that the function returns appropriately by comparing the return address with the saved value of the instruction pointer immediately after the corresponding CALL instruction.

Additional to the core analysis routines, STEM includes a variety of control functionality that assists those routines. The most important of these additional components intercepts signals to deal with dynamically loading configuration and selecting a suitable error virtualization value.

STEM defines three signal handlers and registers them with PIN. The first intercepts SIGUSR1 and sets a flag indicating that policy and configuration will be reloaded, although the actual reload takes place during the execution of the next STEM_Preamble( ). The second signal handler intercepts SIGUSR2 and prints some runtime debugging information. The third intercepts SIGSEGV (for cases where detectors alert on memory errors, such as address space randomization, invalid memory references, or segmentation faults). The handler then causes the repair procedure to be invoked, after it has optionally asked the user to select a response as detailed by the repair policy. Part of the response can include forwarding a snapshot of memory state to support automatically generating an exploit signature.

STEM supports a variety of detection mechanisms to measure the integrity of the computation at various points in program execution and to set a flag that indicates to STEM_Epilogue( ) to initiate a self-healing response. According to one embodiment of the disclosed subject matter, a detector can detect an anomalous set of function calls, for example, a set of functions that deviate from a profile learned when STEM is in profiling mode, as well as a shadow stack that detects integrity violations of the return address or other stack frame information. STEM also intercepts a SIGSEGV produced by an underlying Operating System that employs address space randomization.

The use of PIN is one way to implement STEM and STEM's functionality described in the disclosed subject matter. In other embodiments of the disclosed subject matter, STEM can be implemented through binary emulation. In other embodiments of the disclosed subject matter, STEM can be implemented using virtual machine monitors, for example, "VMWare" and "Parallels." In other embodiments of the disclosed subject matter, STEM can be implemented via source-code rewriting.

The repair policy employed by STEM is discussed in more detail in International Patent Application Publication No. WO 2007/092,524 which is incorporated by reference herein in its entirety.

Figure 6:
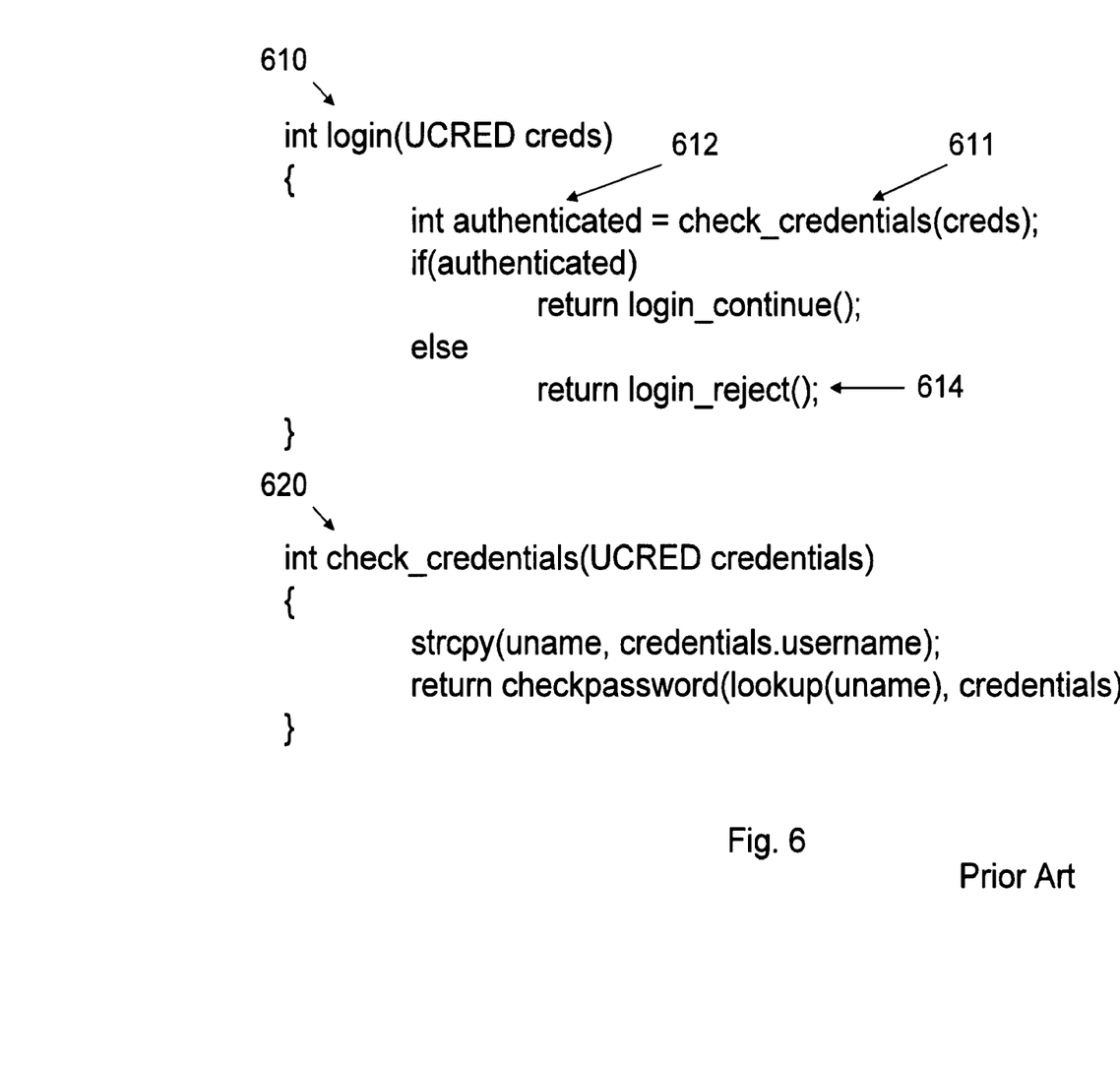
FIG. 6 shows an example of a semantically incorrect response using a self-healing mechanism.

FIG. 6 illustrates a specific example: an error can exist in a routine that determines the access control rights for a client. A function, check_credentials 620, can determine access control rights for a client. Another function, login 610, can call check_credentials 620, at 611, and store the return result in the variable authenticated 612. A value different than zero that gets stored in authenticated 612 causes a successful login. If authenticated 612 has a value of zero, however, the user can be denied access, at 614. If an error arising from a vulnerability in check_credentials 620 occurs, a self-healing mechanism can attempt to return a simulated error code from check_credentials 620. Therefore, if this fault is exploited, a self-healing technique like error virtualization would return a value that allows the authentication check to succeed. This situation occurs precisely because the recovery mechanism is oblivious to the semantics of the code it protects.

One solution to this problem relies on annotating the source code to indicate which routines will not be "healed" or to provide appropriate return values for such sensitive functions. These techniques, however, appear unappealing because of the need to modify source code. Since source-level annotations serve as a vestigial policy, the disclosed subject matter articulates a way to augment self-healing approaches with the notion of a repair policy. A repair policy is specified separately from the source code and describes how execution integrity will be maintained after an attack is detected. A repair policy can provide a way for a user to customize an application's response to an intrusion attempt and can help achieve a completely automated recovery.

The disclosed subject matter provides a theoretical framework for a repair policy by extending the Clark-Wilson Integrity Model (CW) to include the concepts of repair and repair validation. CW is ideally suited to the problem of detecting faults and attacks when constraints on a system's behavior and information structures have been violated. The CW model defines rules that govern three major constructs: constrained data items (CDI), transformation procedures (TP), and integrity verification procedures (IVP). An information system is composed of a set of TPs that transition CDIs from one valid state to another. The system also includes IVPs that measure the integrity of the CDIs at various points of execution.

Although a TP can move the system from one valid state to the next, it can fail for a number of reasons, for example, incorrect specification, a vulnerability, or hardware faults. The purpose of an IVP is to detect and record this failure. CW does not address the task of returning the system to a valid state or formalize procedures that restore integrity. In contrast, the repair policy focuses on ways to recover after an unauthorized modification. The extensions in the disclosed subject matter supplements the CW model with primitives and rules for recovering from a policy violation and validating that the recovery was successful.

STEM interprets the repair policy to provide a mechanism that can be selectively enforced and retrofitted to the protected application without modification of its source code. As with most self-healing systems, the repairs offered by this "behavior firewall" are temporary constraints on the program behavior. They are emergency fixes that await a more comprehensive patch from the application vendor. However, unlike a patch, when using a repair policy an administrator can "turn off" a broken repair policy without affecting the execution of the program.

The repair policy is specified in a file external to the source code of the protected application and is used only by STEM, i.e., the compiler, the linker, and the OS are not involved. This file describes the legal settings for variables in an aborted transaction. The basis of the policy is a list of relations between a transaction and the CDIs that need to be adjusted after error virtualization, including the return address and return value.

Figure 1:
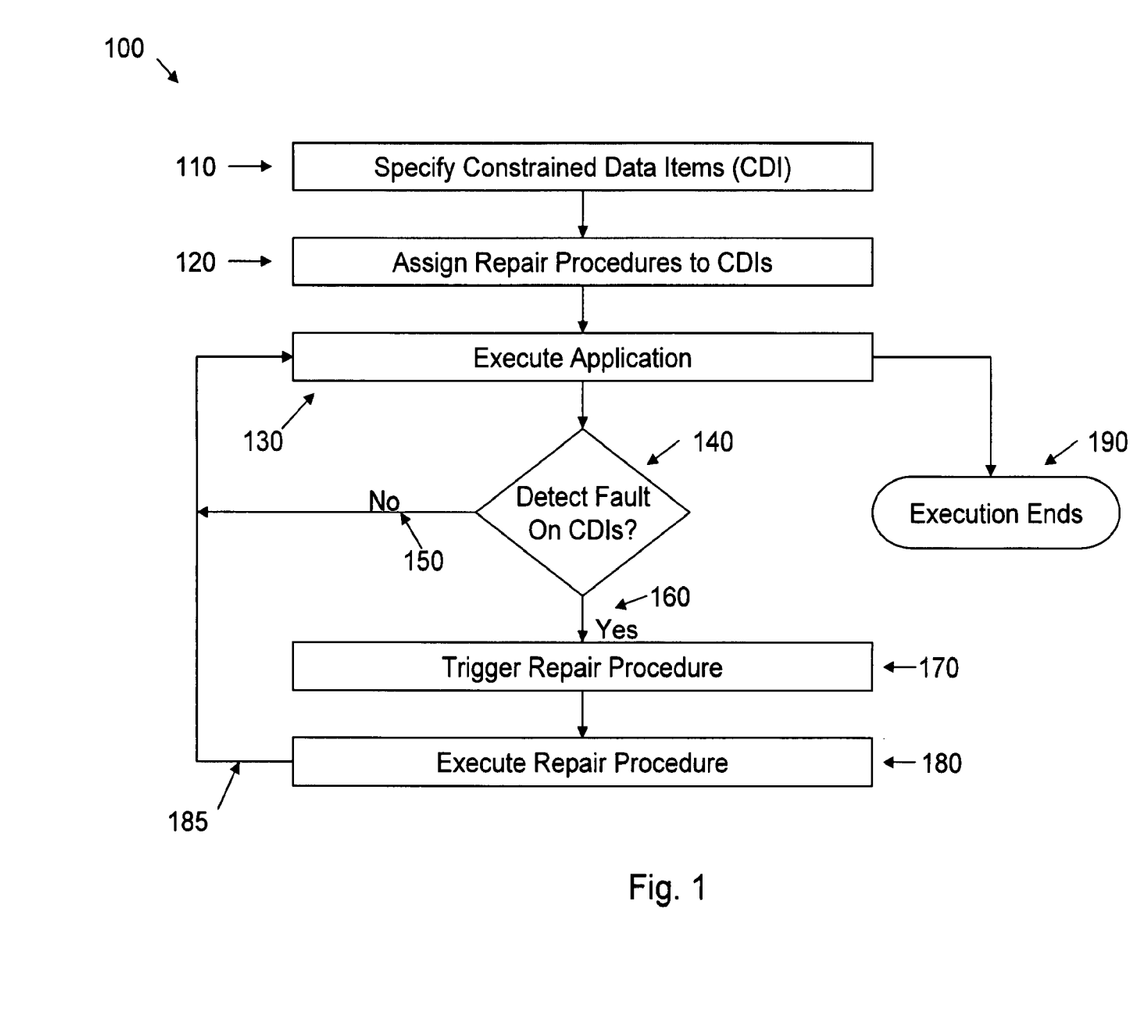
FIG. 1 shows a simplified illustration of a method for recovering a software application from a fault according to some embodiments of the disclosed subject matter.

FIG. 1 shows a simplified illustration of a method 100 for recovering from a fault according to some embodiments of the disclosed subject matter. The constrained data items are specified 110 and repair procedures are specified to them 120. The application executes 130 and the execution is checked for faults of the CDIs 140. If there are no faults detected 150, the execution continues normally. In the other case, when a fault is detected 160, a repair policy is triggered 170. The triggered repair policy is executed 180 and the execution of the application is restored 185. The application is continuously monitored for faults until the end of execution 190.

According to an embodiment of the disclosed subject matter, a form of a repair policy:
specifies appropriate error virtualization settings to avoid an incorrect return value that can cause problems.
provides memory rollback for an aborted transaction.
sets memory locations to particular values.

Figure 2:
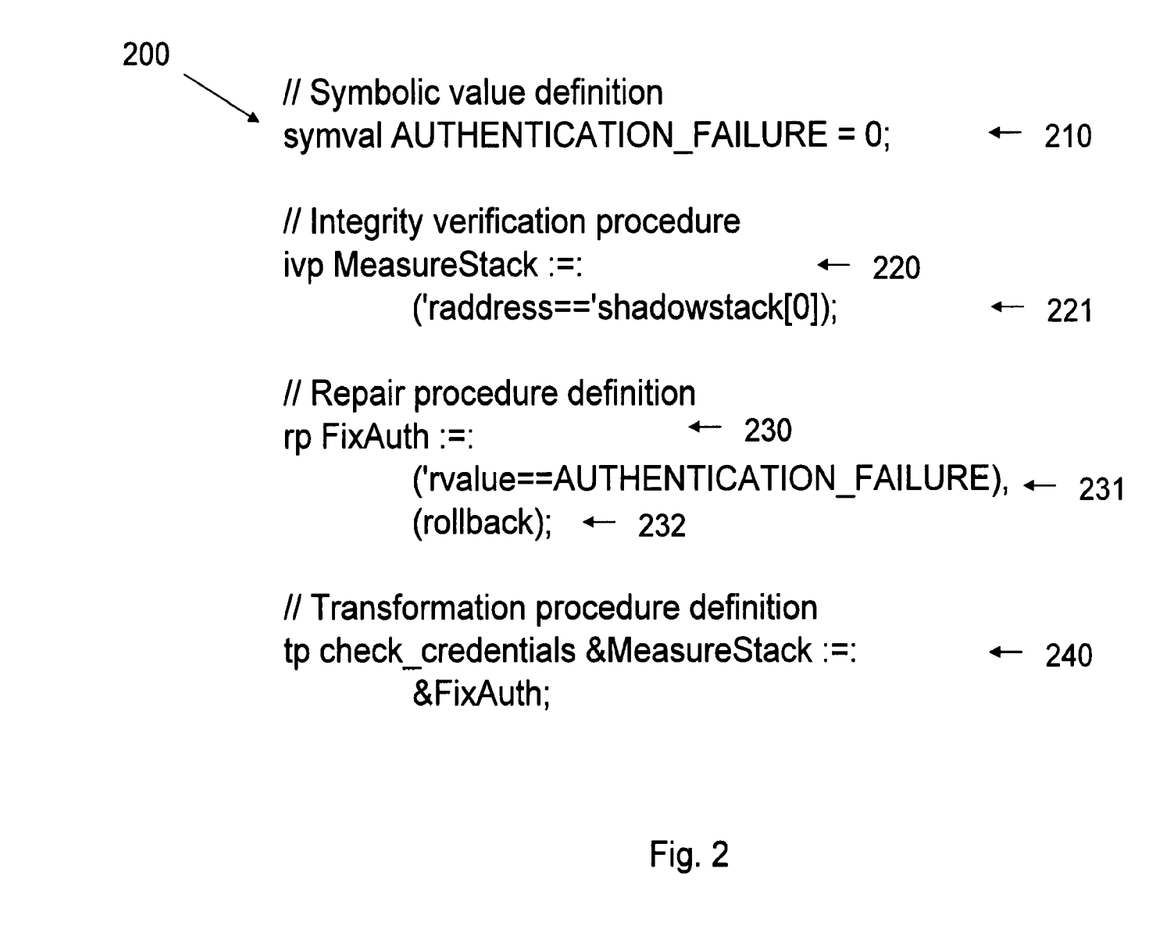
FIG. 2 shows a sample repair policy according to some embodiments of the disclosed subject matter.

FIG. 2 shows a sample repair policy for the problem illustrated in FIG. 6. The first statement declare a symbolic value (AUTHENTICATION_FAILURE) 210. The latter three statements declare an IVP 220, a repair procedure (RP) 230, and a TP 240. The IVP defines a simple detector that utilizes STEM's shadow stack 221. The RP sets the return value to a semantically correct value 231 and indicates that memory changes will be undone 232, and the TP definition links these measurement and repair activities together. An RP can contain a list of asserted conditions on CDIs that will be true after the self-healing completes. If the TP named check_credentials fails, then the memory changes made during this routine are reset and STEM stores the value "0" in the return value, and thus the variable authenticated, causing the login attempt to fail. The example illustrates the use of the special variable 'rvalue (the apostrophe used to distinguish it from a CDI named rvalue). This variable helps customize plain error virtualization to avoid problems similar to the one encountered in FIG. 6.

Figure 3:
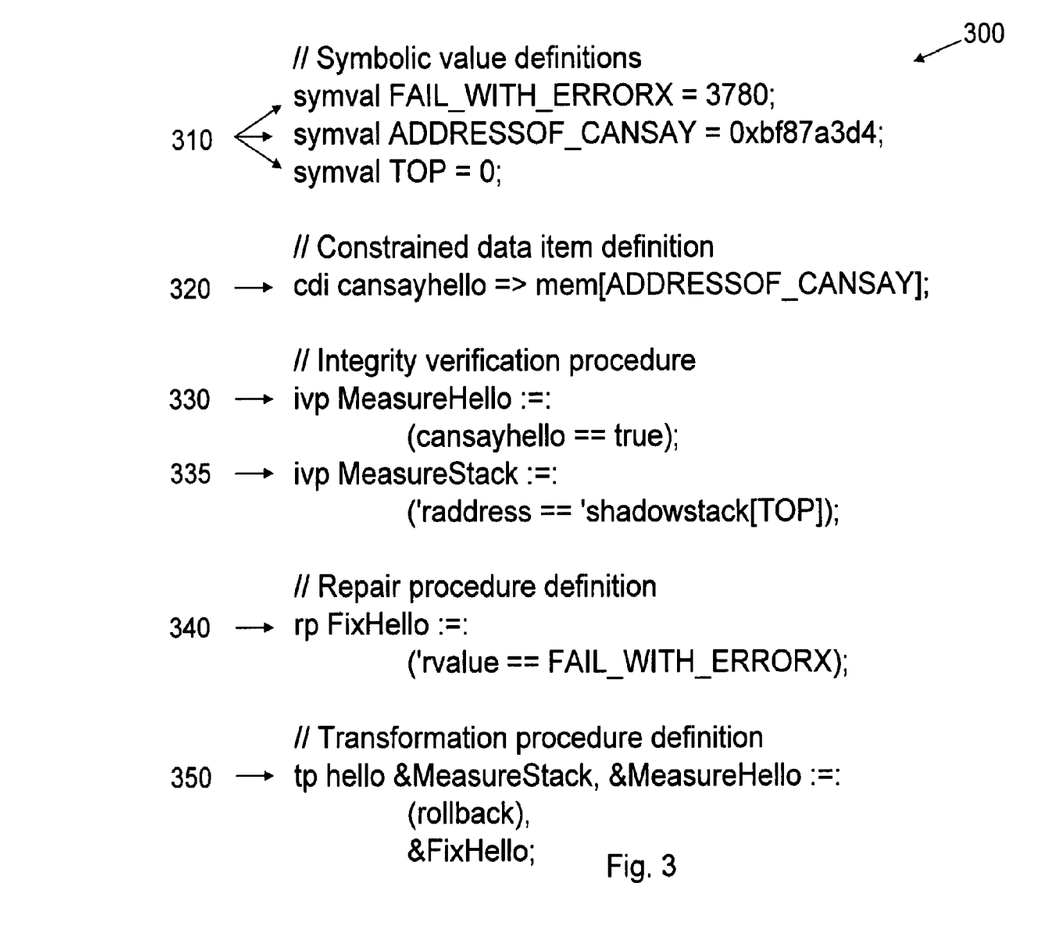
FIG. 3 shows a sample repair policy according to some embodiments of the disclosed subject matter.

FIG. 3 shows another sample repair policy example 300. The first three statements declare three symbolic values 310 (FAIL_WITH_ERRORX, ADDRESSOF_CANSAY, and TOP). The next statement declares a CDI 320 named cansayhello and associates it with the address 0xbf87a3d4. The IVP statements declare MeasureHello 330 and MeasureStack 335. MeasureHello states the appropriate value of cansayhello when the IVP is invoked. The IVP MeasureStack binds a constraint involving the 'raddress and the first position of a shadow return address stack. The next statement declares an RP 340 that indicates an appropriate return value. In this case, 'rvalue is assigned to the symbolic value FAIL_WITH_ERRORX, i.e. the value "3780." The final statement declares a TP named hello 350 and binds MeasureStack and MeasureHello with hello, which implies that after hello has executed cansayhello is compared with true, and the relation between 'raddress and' shadowstack[TOP] is measured before hello returns. According to the example, the self-healing response involves the action of rolling back the memory changes made during hello, as well as setting the return value of hello to "3780."

Attempts to sandbox an application's execution are expected sooner or later to allow the application to deal with global input and output sources and sinks that are beyond the control of the sandbox. Microspeculation becomes unsafe when the speculated process slice communicates with entities beyond the control of STEM. If a transaction is not idempotent, i.e., it alters a global state such as shared memory, network messages, etc., then microspeculation is expected to stop before that global state is changed. The self-healing system can no longer safely speculate a code slice, because the results of execution up to that point are committed, thus limiting microspeculation's effective scope. Repair attempts can fall short in situations where an exploit on a machine, for example, an electronic funds transfer front-end that is being "healed," has visible effects on another machine, for example, a database that clears the actual transfer. For example, if a browser exploit initiates a PayPal transaction, even though STEM can recover control on the local machine, the user will not have an automated recourse with the PayPal system.

Such situations expect additional coordination between the two systems, therefore, microspeculation is expected to span both machines. If both machines reside in the same administrative domain, achieving this cooperative microspeculation is somewhat easier, but the disclosed subject matter describes a solution that works for situations like the PayPal example. While a self-healing system can record I/O, it cannot ask a communications partner to replay the input or re-accept the output. Doing so means that the protocol and potentially the network infrastructure support speculative messaging and entail changing the partner's implementation so that it can rewind its own execution. Since STEM can not be widely deployed, the disclosed subject matter does not rely on this type of explicit cooperation.

Co-operative microspeculation can be achieved in at least four ways. The four ways expresses a trade-off between semantic correctness and invasiveness. The solutions include:

Protocol Modification. Involves modifying network or filesystem protocols and the network infrastructure to incorporate an explicit notion of speculation.

Modify Communications Partner. Involves modifying the code of the remote entity to cooperate when the protected application is microspeculating, and thus to anticipate when it will be sending or receiving a "speculated" answer or request.

Gradual Commits. Transactions can be continuously limited in scope. Memory changes occurring before an I/O call are marked as not undoable. If the microspeculated slice fails, STEM will only undo changes to memory made after the I/O call.

Virtual Proxies. Involves use of buffers to record and replay I/O locally. Virtual proxies effectively serve as a man-in-the-middle during microspeculation to delay the effects of I/O on the external world.

While some network and application-level protocols already include a notion of "replay" or speculative execution, implementing widespread changes to protocol specifications and the network infrastructure is fairly invasive. Nevertheless, it presents an interesting technical research challenge. Another interesting possibility is to modify the execution environment or code of the remote communications partner to accept notifications from a STEM-protected application. After receiving the notification, the remote entity speculates its own I/O. While this approach promises a sound solution, it violates transparency requirements.

According to an embodiment of the disclosed subject matter, STEM uses gradual commits and virtual proxies. These solutions have the least impact on current application semantics and have a straightforward implementation. Since the local entity is already modified, modifying the remote entity or protocols can be avoided. Using gradual commits and virtual proxies, the power of the solution is constrained, but this is an acceptable tradeoff. Moreover, legacy setups are to be perturbed as little as possible, especially as self-healing systems gain traction.

I/O system calls that occur during the speculated portion of a process constitute a challenge for safely discarding speculated operations when an exploit occurs. While speculation can immediately resume after an I/O call, the I/O call itself cannot be replayed or undone. If a fault or exploit occurs after the I/O call, emulating still in the microspeculated routine, then STEM cannot rewind to the beginning of the code slice. Rather, it can only unwind back to the I/O call. Memory and other state changes before the I/O call are expected to remain in effect. This gradual process of commits is one way to attempt to control uncertainty in the correctness of the response.

A virtual proxy serves as a delegate for a communications partner, for example, a server, a client, or a peer, for the application that STEM is supervising. A virtual proxy is composed of a set of functions that modify a buffer that is bound during the scope of a supervised routine. The primary function of the virtual proxy is to allow STEM, as it speculates a slice of an application, to "take back" some output or "push back" some input. According to an embodiment of the disclosed subject matter STEM can intercept read and write calls.

A virtual proxy input and a virtual proxy output handle this two-part problem. A virtual proxy input is employed when an external component, for example, a filesystem, is providing input. A code slice that contains an input call can either successfully complete without an error or exploit, or experience such a fault and have STEM attempt a repair. In the first case, no further action needs to happen because STEM's state is consistent with the global state. In the case where the code slice experiences a fault, STEM attempts a semantically correct repair, regardless of whether or not the input was legal, malformed, or malicious. However, the external entity believes its state has changed. Therefore it will not replay the input. STEM can continue executing with the input removed from the input buffer that was supposed to be consumed by the transaction and draw from the virtual proxy's buffers during the next input request.

STEM uses a virtual proxy output to deal with speculated output and buffers the output until it needs input from an external component. When an input is needed, STEM allows the remote partner to make progress. This is a process of gradual commits. As with a virtual proxy input, the speculated slice can either successfully complete without an error or exploit, or experience such a fault and have STEM attempt a repair. In the first case, gradual commits suffice, as the output calls simply finish. In the case where the code slice experiences a fault, the external component has been given a message it should not have. If the virtual proxy was not operating, a STEM-supervised application would need to ask for that output to be ignored. The virtual proxy allows STEM to buffer output until the microspeculated slice successfully completes. If the slice fails, then STEM instructs the virtual proxy to discard or replace the output.

Referring to the method illustrated in FIG. 1, input data can be received through the virtual proxy input and output data can be sent through the virtual proxy output during the execution of the application 130.

The behavior modeling employed by STEM is discussed in International Patent Application No. PCT/US2007/012,784 which is incorporated by reference herein in its entirety.

Although STEM uses a number of detection strategies, including a shadow stack, STEM also provides for host-based anomaly detection. This type of detection helps identify previously unknown vulnerabilities and exploits, but depends on the system having a model or profile of normal behavior. STEM collects aspects of data and control flow to learn an application's behavior profile. STEM can leverage the information in the profile to detect misbehavior, i.e., deviation from the profile, and automatically validate repairs to ensure that self-healing achieves normal application behavior.

In profiling mode, STEM dynamically analyzes function calls made by the process, including regular functions and library calls as well as system calls. Previous work typically examines only system calls or is driven by static analysis. STEM collects a feature set that includes a mixture of parent functions and previous sibling functions. STEM generates a record of the observed return values for various invocations of a function.

A behavior profile is a graph of execution history records. A record contains four data items:
an identifier
a return value
a set of argument values
a context Each function name serves as an identifier. Addresses and callsites can also be used. A mixture of parents and previous siblings compose the context. The argument and return values correspond to the argument values at the time that function instance begins and ends, respectively. STEM uses a pair of analysis functions, inserted at the start and end of a routine, to collect the argument values, the function name, the return value, and the function context.

Each record in the profile helps to identify an instance of a function. The feature set "unflattens" the function namespace of an application. For example, printf( ) appears many times with many different contexts and return values, making it hard to characterize. Considering the occurrences of printf( ) to be the same instance reduces our ability to make predictions about its behavior. On the other hand, considering the occurrences of printf( ) to be separate instances increases the space of possible behaviors and similarly reduces our ability to make predictions about its behavior in a reasonable amount of time. Therefore, it is important to construct an "execution context" for a function based on both control flow, for example, predecessor function calls, and data flow, for example, return and argument values. This context helps collapse occurrences of a function into an instance of a function.

Figure 7:
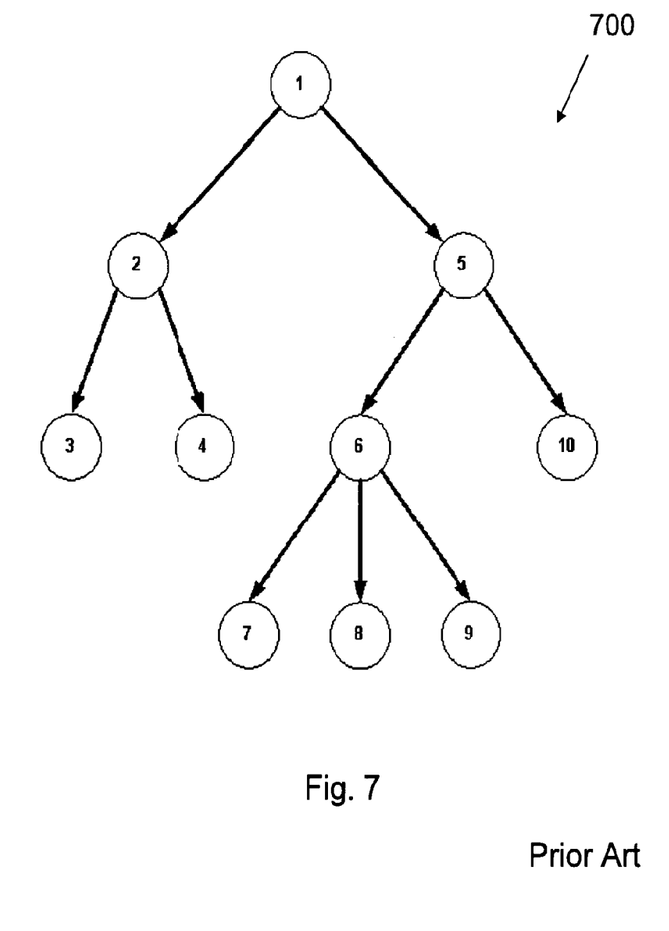
FIG. 7 shows an example of computing an execution window context.

FIG. 7 shows an example 700 of computing an execution window context. Starting from function 8, the graph is traversed beginning from the previously executed siblings up to the parent. This algorithm is recursively repeated for the parent until the root or the window width is reached. In the example depicted in FIG. 7, the window contains functions 7, 6, 5, 2, and 1. Systems that examine the call stack would only consider 6, 5, and 1.

During training, one behavior aspect that STEM learns is which return values to predict based on the execution contexts of varying window sizes. A general procedure attempts to compute the prediction score by iteratively increasing the window size and seeing if additional information is revealed by considering the extra context.

Figure 4:
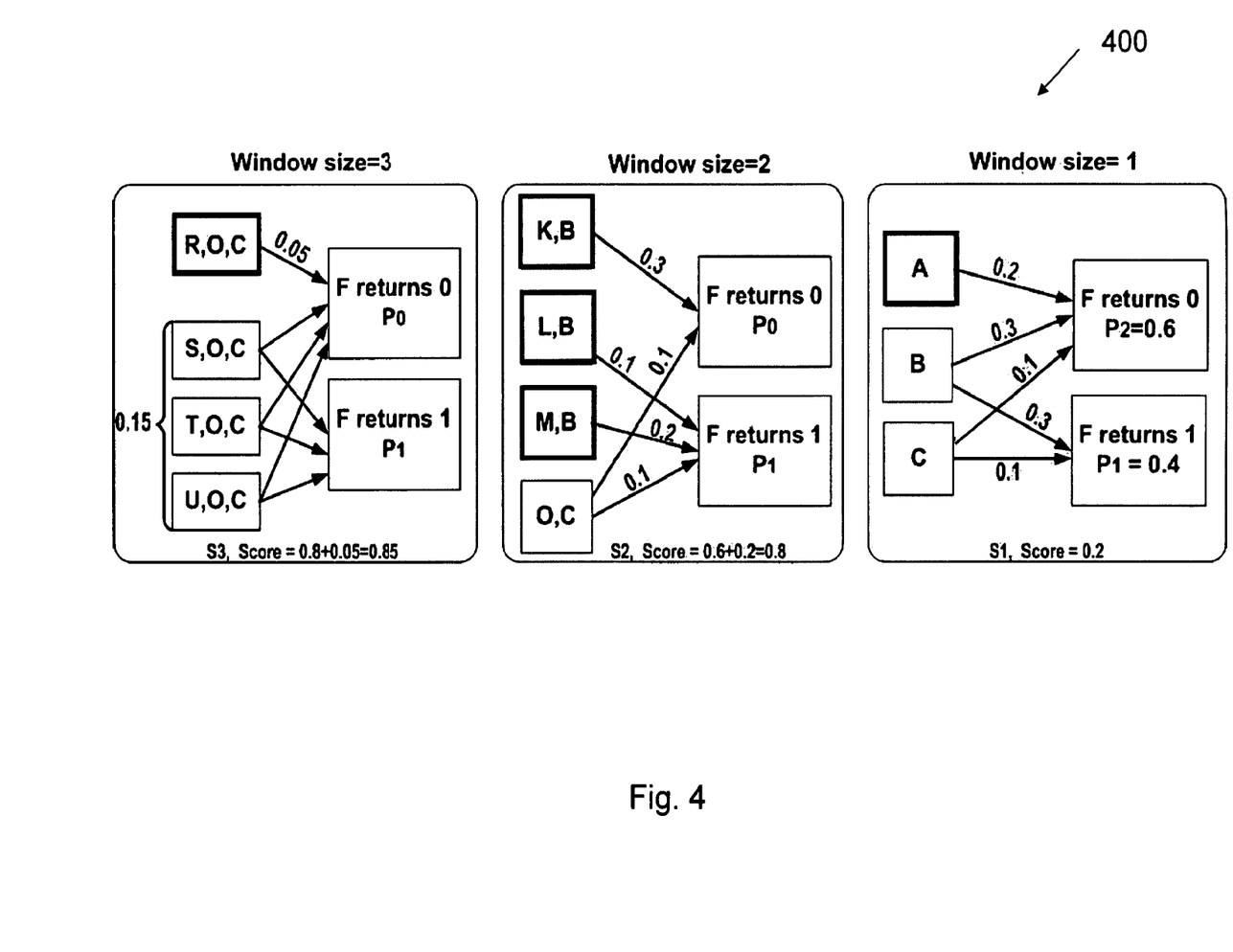
FIG. 4 shows an example of computing a return value predictability score according to some embodiments of the disclosed subject matter.

A return value "predictability score" is defined as a value from zero to one. For a context window, the "individual score" is calculated as the relative frequency of this particular window when compared with the rest of the windows leading to a function. The predictability score for a function is the sum of the individual scores that lead to a single return value. FIG. 4 displays an example 400 of computing a return value predictability score. Specifically, it illustrates the procedure for function F and for two return values 0 and 1 for three window sizes. The arrow labels indicate what percentage of instances for the given window will lead to the return value of F when compared with the rest of the windows. For window size 1 (S1) there are three predicate functions (A, B, and C) with only one, A, leading to a unique return value with score 0.2. This score is the relative frequency of window AF, when compared with the other windows leading to F, for the return values. A score is added to the total score when a window leads to single return value of F since this situation is the only case that "predicts" a return value. Only the smallest windows that lead to a single value are considered, since the information that they impart is already subsumed by the smaller execution context. For example, A is no longer considered for S2 and KB, LB, MB for S3, because larger windows do not add anything to our knowledge for the return value.

The time to self-heal depends on the complexity of the repair policy, for example, the number of memory locations that need to be adjusted, and the memory log rollback. Memory log rollback is an O(n) operation, where n is the number of memory locations that need to be adjusted.

Removing supervision of the startup code of an application improves performance over full supervision. Most of the work done during startup includes loading and resolving libraries for dynamically linked applications. STEM can avoid instrumenting this work, and therefore noticeably reduce the startup time, by simply not making the application dynamically linked.

PIN can attach to applications after they have started, therefore, STEM can wait until this work completes and then attach to protect the mainline code execution paths. Additionally, the application can begin executing normally and STEM can be attached when a network anomaly detector issues an IDS alert. Finally, it can be acceptable for certain long-running applications, for example, web, mail, database, and DNS servers, to amortize this long startup time, which is on the order of minutes, over the total execution time, which is on the order of weeks or months.

Performance of supervised routines can be improved by modifying the memory log implementation, which is currently based on a linked list. One way to improve performance is to pre-allocate memory slots based on the typical memory use of a supervised function. If the number of stores in a piece of code can be bounded, for example, if STEM or another profiling tool has observed its execution, then STEM can pre-allocate an appropriately sized buffer.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways within the scope and spirit of the invention.

What is claimed is:

1. A method for enabling software applications to recover from fault conditions, the method comprising:
    assigning, using a hardware processor, a first repair procedure to a first memory location within a software application and a second repair procedure to a second memory location within the software application that is different from the first memory location;
    determining that a fault condition during execution of the software application exists that triggers at least one of the first repair procedure and the second repair procedure;
    determining an address of a memory location associated with the triggered repair procedure;
    assigning a value to the determined address associated with the memory location; and
    restoring the execution of the software application based on a memory log of changes to memory during the execution of the software application.

2. The method of claim 1, further comprising specifying the first memory location and the second memory location within the software application.

3. The method of claim 1, further comprising maintaining the memory log of changes to memory during the execution of the software application.

4. The method of claim 1, further comprising:
    receiving input data from an external entity using a virtual input proxy; and
    sending output data to the external entity using a virtual output proxy.

5. The method of claim 1, wherein the first repair procedure corresponds to a first value and the second repair procedure corresponds to a second value.

6. The method of claim 1, wherein the restoring further comprises providing memory rollback to a point of execution of the software application before the fault condition was determined.

7. A system for enabling software applications to recover from fault conditions, the system comprising:
    a hardware processor that is configured to:
        assign a first repair procedure to a first memory location within a software application and a second repair procedure to a second memory location within the software application that is different from the first memory location;
        determine that a fault condition during execution of the software application exists that triggers at least one of the first repair procedure and the second repair procedure;
        determine an address of a memory location associated with the triggered repair procedure;
        assign a value to the determined address associated with the memory location; and
        restore the execution of the software application based on a memory log of changes to memory during the execution of the software application.

8. The system of claim 7, wherein the hardware processor is further configured to specify the first memory location and the second memory location within the software application.

9. The system of claim 7, wherein the hardware processor is further configured to maintain the memory log of changes to memory during the execution of the software application.

10. The system of claim 7, wherein the hardware processor is further configured to:
    receive input data from an external entity using a virtual input proxy; and
    send output data to the external entity using a virtual output proxy.

11. The system of claim 7, wherein the first repair procedure corresponds to a first value and the second repair procedure corresponds to a second value.

12. The system of claim 7, wherein the hardware processor is further configured to provide memory rollback to a point of execution of the software application before the fault condition was determined.

13. A non-transitory computer-readable medium containing computer-executable instructions that, when executed by a processor, cause the processor to perform a method for enabling software applications to recover from fault conditions, the method comprising:
    assigning a first repair procedure to a first memory location within a software application and a second repair procedure to a second memory location within the software application that is different from the first memory location;
    determining that a fault condition during execution of the software application exists that triggers at least one of the first repair procedure and the second repair procedure;
    determining an address of a memory location associated with the triggered repair procedure;

assigning a value to the determined address associated with the memory location; and restoring the execution of the software application based on a memory log of changes to memory during the execution of the software application.

14. The non-transitory computer-readable medium of claim 13, wherein the method further comprises specifying the first memory location and the second memory location within the software application.

15. The non-transitory computer-readable medium of claim 13, wherein the method further comprises maintaining the memory log of changes to memory during the execution of the software application.

16. The non-transitory computer-readable medium of claim 13, wherein the method further comprises:

receiving input data from an external entity using a virtual input proxy; and sending output data to the external entity using a virtual output proxy.

17. The non-transitory computer-readable medium of claim 13, wherein the first repair procedure corresponds to a first value and the second repair procedure corresponds to a second value.

18. The non-transitory computer-readable medium of claim 13, wherein the method further comprises providing memory rollback to a point of execution of the software application before the fault condition was determined.

* * * * *